(12) United States Patent
Sekar et al.

(10) Patent No.: US 11,607,961 B2
(45) Date of Patent: Mar. 21, 2023

(54) MODULAR ELECTRIC VEHICLE BATTERY PACK FRAME HAVING EXTRUDED ALUMINUM STRUCTURAL MEMBERS

(71) Applicant: Rivian IP Holdings, LLC, Plymouth, MI (US)

(72) Inventors: Vignesh Sekar, Westland, MI (US); Kyle Butterfield, Rancho Santa Margarita, CA (US); Tyler Collins, Irvine, CA (US); Nathaniel C. Wynn, Tustin, CA (US); Kyle O'Neil, Los Angeles, CA (US); Ehsan Baseri, Irvine, CA (US); Jagannathan Shankar Mahadevan, Canton, MI (US); Anish Shah, Ann Arbor, MI (US)

(73) Assignee: Rivian IP Holdings, LLC, Plymouth, MI (US)

( * ) Notice: Subject to any disclaimer, the term of this patent is extended or adjusted under 35 U.S.C. 154(b) by 570 days.

(21) Appl. No.: 16/681,645

(22) Filed: Nov. 12, 2019

(65) Prior Publication Data

US 2020/0148066 A1 May 14, 2020

Related U.S. Application Data

(60) Provisional application No. 62/760,536, filed on Nov. 13, 2018.

(51) Int. Cl.
*H01M 4/02* (2006.01)
*B60L 50/64* (2019.01)
*H01M 50/20* (2021.01)

(52) U.S. Cl.
CPC ............. *B60L 50/64* (2019.02); *H01M 50/20* (2021.01); *B60Y 2400/112* (2013.01)

(58) Field of Classification Search
CPC ...................................................... H01M 4/02
See application file for complete search history.

(56) References Cited

U.S. PATENT DOCUMENTS

| 5,501,289 A | 3/1996 | Nishikawa et al. | |
|---|---|---|---|
| 2011/0305930 A1* | 12/2011 | Han ................... | H01M 50/213 429/82 |
| 2013/0241493 A1* | 9/2013 | Kosaki ................ | H01M 10/613 320/128 |
| 2018/0026243 A1* | 1/2018 | Stojanovic ........... | H01M 50/20 429/99 |
| 2018/0186227 A1 | 7/2018 | Stephens et al. | |

OTHER PUBLICATIONS

International Search Report and Written Opinion of PCT/US2019/060988 dated Feb. 24, 2020.

* cited by examiner

*Primary Examiner* — Jacob B Marks
(74) *Attorney, Agent, or Firm* — Haley Guiliano LLP

(57) ABSTRACT

Electric vehicle battery pack frames constructed with extruded aluminum side and cross members. Such frames are significantly stronger than conventional cast aluminum frames, while also being much lighter than steel frames. Cross members may be affixed to side members with extruded aluminum brackets. Side members of differing lengths may be employed, to make battery pack frames of differing sizes in modular manner. Battery pack lids and bottom panels may be removably affixed to the frame such as with bolts, for improved serviceability.

20 Claims, 3 Drawing Sheets

MODULAR ELECTRIC VEHICLE BATTERY PACK FRAME HAVING EXTRUDED ALUMINUM STRUCTURAL MEMBERS

CROSS REFERENCE TO RELATED APPLICATION

This application claims the benefit of U.S. Provisional Patent Application No. 62/760,536, filed Nov. 13, 2018, the disclosure of which is hereby incorporated by reference herein in its entirety.

INTRODUCTION

The present disclosure is directed to electric vehicle battery pack frames. More specifically, the present disclosure is directed to electric vehicle battery pack frames having extruded aluminum structural members.

SUMMARY

A vital component of current electric vehicles is the battery pack. Conventional battery packs perform a number of functions, including providing a protective enclosure to withstand crash or other impacts, routing of electrical wires, and containment of battery fires.

Battery pack frames have conventionally been constructed as steel frames. However, such frames suffer from significant drawbacks. The high density of steel results in excessively heavy frames. Attempts to form lighter frames from materials such as cast aluminum have been unsuccessful due largely to the insufficient strength of cast aluminum.

Accordingly, described herein is an improved electric vehicle battery pack frame constructed of extruded aluminum. More specifically, the various structural members of the frame are extruded aluminum members. Extruded aluminum is significantly stronger than cast aluminum, and as aluminum is much lighter than steel, frames made of extruded aluminum are significantly stronger than conventional cast aluminum frames, while also being much lighter than steel frames.

Battery pack frames of embodiments of the disclosure are constructed with a pair of side members, and a number of cross members extending between and coupled to inner surfaces of the side members. The side members and connective cross members are each made of extruded aluminum, and collectively form a frame structure within which electric vehicle batteries may be placed. In operation, the extruded aluminum frame is of sufficient strength to protect the batteries from damage and the elements, while being significantly lighter than steel frames.

The cross members can be affixed to the side members with brackets, which can also be made of extruded aluminum. The brackets themselves may be affixed to the inner surfaces of each side member in any manner, such as with an adhesive, or one or more fasteners such as flow drill screws. Likewise, each bracket may be affixed to its respective cross member in any manner, such as with an adhesive, or one or more fasteners such as flow drill screws.

Embodiments of the disclosure also provide a set of members for a modular battery pack frame that can be readily constructed in differing sizes. Differing side members can be provided, of differing lengths. The same cross members can be used with side members of each length, so that battery packs of differing sizes can be made using side members of a desired length. In this manner, one set of members can be used to construct battery packs of differing sizes, as desired. As above, each of the side members and cross members may be made of extruded aluminum.

BRIEF DESCRIPTION OF THE FIGURES

The above and other objects and advantages of the disclosure will be apparent upon consideration of the following detailed description, taken in conjunction with the accompanying drawings, in which like reference characters refer to like parts throughout, and in which.

DETAILED DESCRIPTION

In some embodiments, the disclosure relates to electric vehicle battery pack frames constructed with extruded aluminum side and cross members. Such frames are significantly stronger than conventional cast aluminum frames, while also being much lighter than steel frames.

Figure 1:
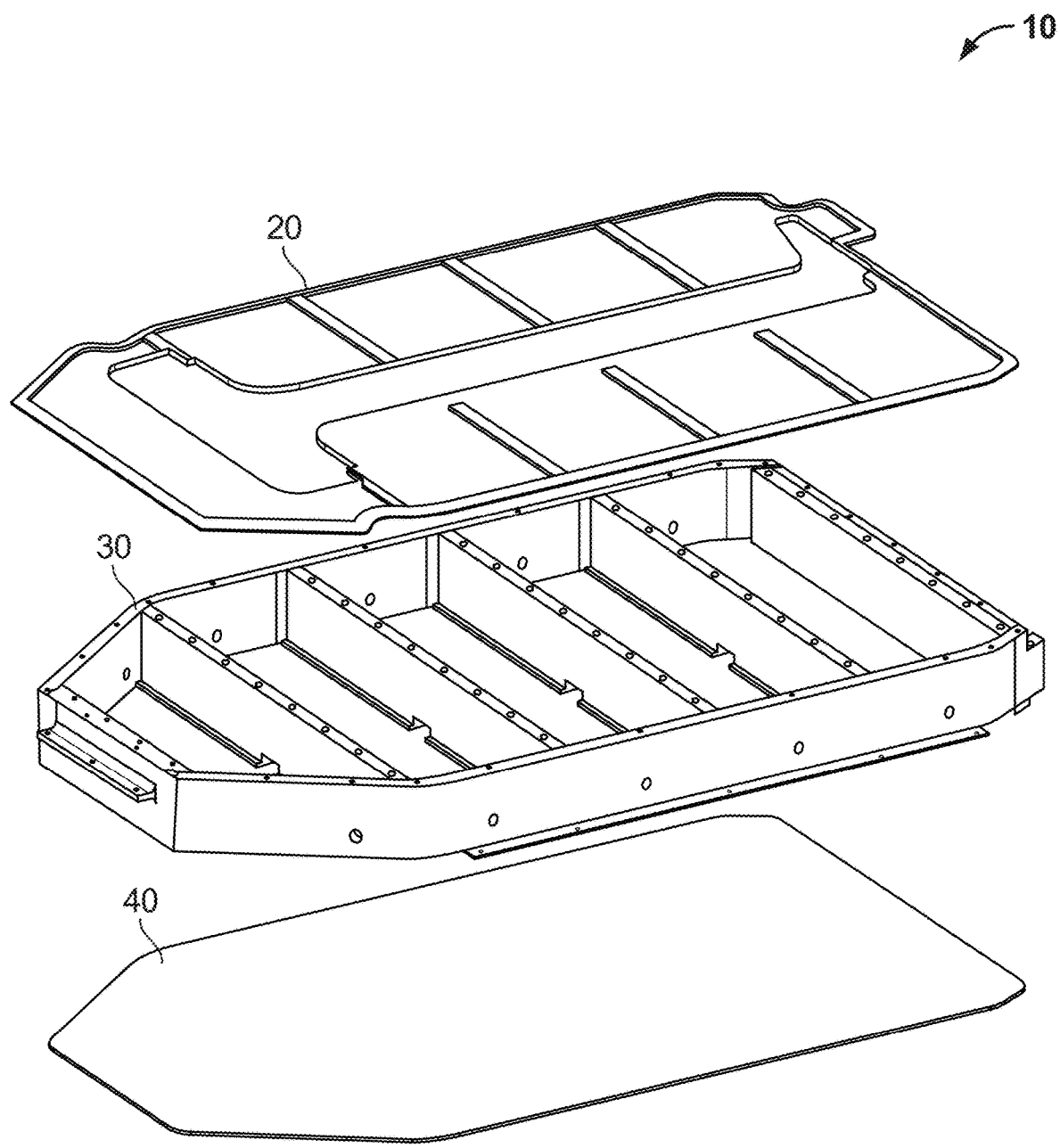
FIG. 1 is an isometric assembly view of an electric vehicle battery pack lid, frame, and bottom layer, constructed in accordance with embodiments of the disclosure.

Battery packs may have a frame that provides the structural rigidity and strength to withstand impact, a bottom layer, and a top layer or lid. As shown in FIG. 1, a battery pack 10 has a pack lid 20 and bottom layer 40 that are positioned above and below frame 30 and that are each affixed thereto to enclose a number of battery modules, which are not shown but which are contained within the frame 30.

Figure 2:
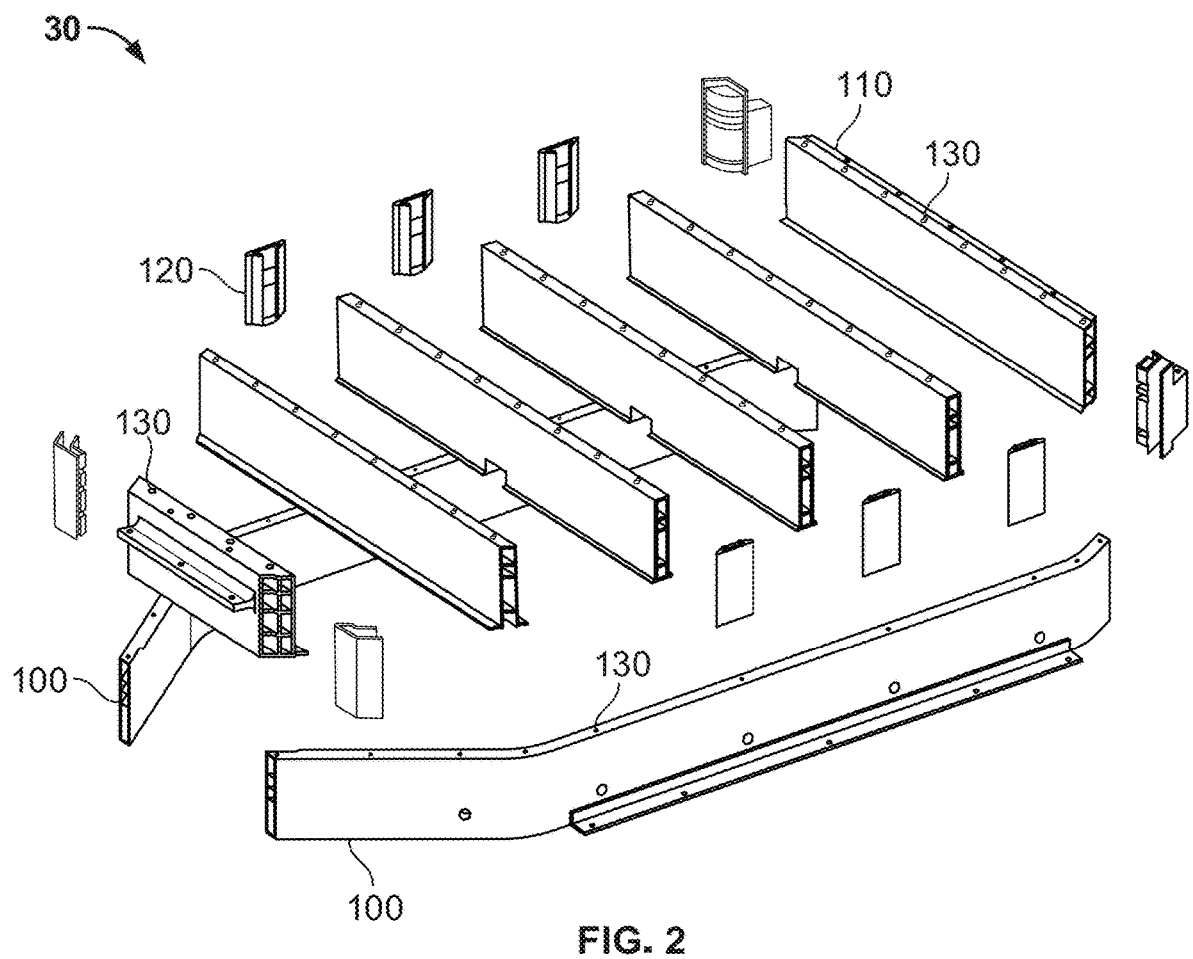
FIG. 2 is an isometric exploded view of an electric vehicle battery pack frame constructed in accordance with embodiments of the disclosure.

FIG. 1 and FIG. 2 show assembled and exploded views, respectively, of an extruded aluminum frame constructed according to embodiments of this disclosure. As can be seen in the middle portion of FIG. 1 and in FIG. 2, the frame 30 has two side members 100 that extend along opposite outer sides of the battery pack 10, and a number of cross members 110 extending parallel to each other between the two side members 100. Opposite ends of each cross member 110 are connected to each side member 100 by the brackets 120 shown in FIG. 2, although the side members 100 and cross members 110 may be connected to each other in any manner that provides sufficient strength for the resulting frame 30 to protect batteries within in the event of vehicle impact.

The side members 100 and cross members 110 may each have any geometry that allows for sufficient room for battery storage within frame 30, and sufficient strength to provide structural rigidity and impact resistance. As one example, one or more cross members 110 may be successively positioned along side members 100 in generally parallel manner to each other, to create two or more channels therebetween. The internal cross members 110 provide additional structural rigidity to maintain spacing between side members 100 and impact resistance. In the embodiment shown, cross members 100 have a generally rectangular cross-section and comprise four internal channels for rigidity and weight savings, although any number and geometry of such cross members 100 and channels is contemplated. In other embodiments, no such channels are present, and the cross members 100 may be entirely hollow, entirely solid, or any geometry inbetween. In addition, in some embodiments, one or more of the channels of side members 100 may be used for venting gas or routing liquid out of the battery pack. For example, holes may be machined or otherwise created in side members 100 to enable gas or liquid to enter into an internal channel. Any number and locations of such holes are contemplated.

The side members 100, cross members 110, and brackets 120 may each be machined or otherwise acted upon in any manner, to accommodate any other structures within the battery pack. For example, as illustrated, several of the cross members 110 include a center cutout proximate to their bottom surfaces, to accommodate structures such busbars and coolant piping. As another example, flanges proximate to the bottom surfaces of cross members 110 may better interface with bottom layer 40, or provide support for other components. Any number, types, and locations of such features are contemplated.

The cross members 110, side members 100, and brackets 120 are each formed as extruded aluminum members. A side impact load acting on the cross members 110 for a vehicle of weight>2600 kg is known to be on the order of 600 kN. An extruded aluminum cross member 110 can support this load axially in a much lower package space as compared to a stamped or roll formed steel cross member, and at a >20% weight savings. This provides a smaller frame, allowing more free space within the frame 30 for batteries, and in turn improving the energy density of the overall battery pack 10.

Figure 3:
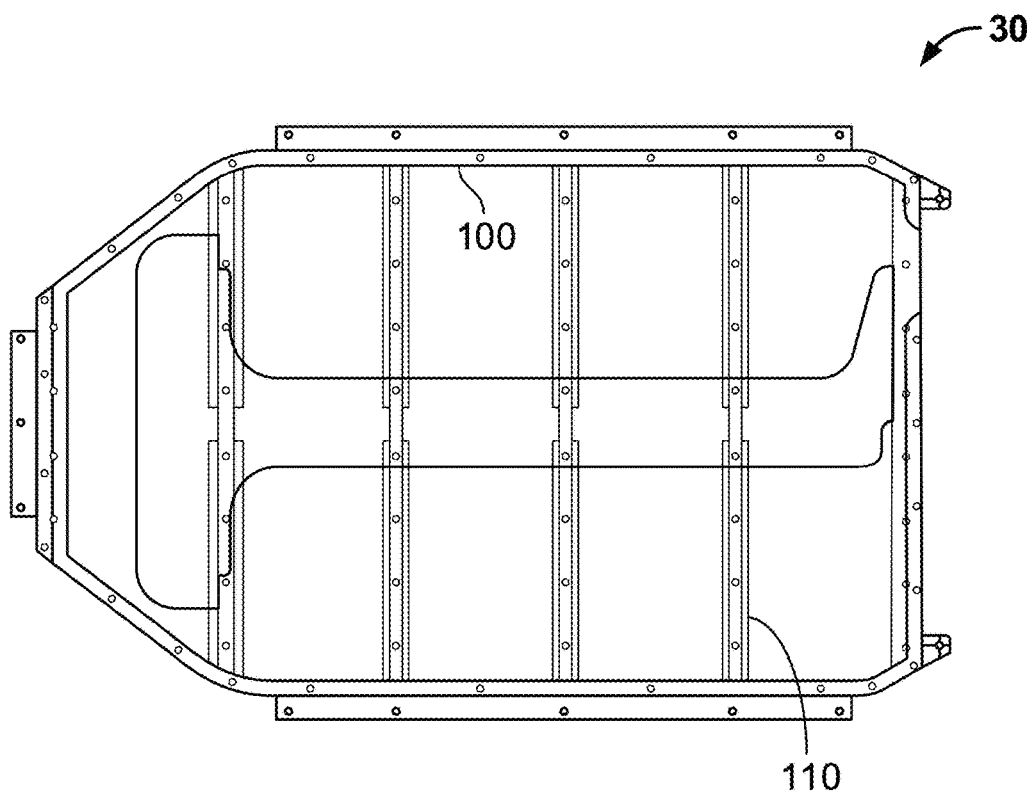
FIG. 3 is a top view of a standard sized electric vehicle battery pack frame constructed in accordance with embodiments of the disclosure.
Figure 4:
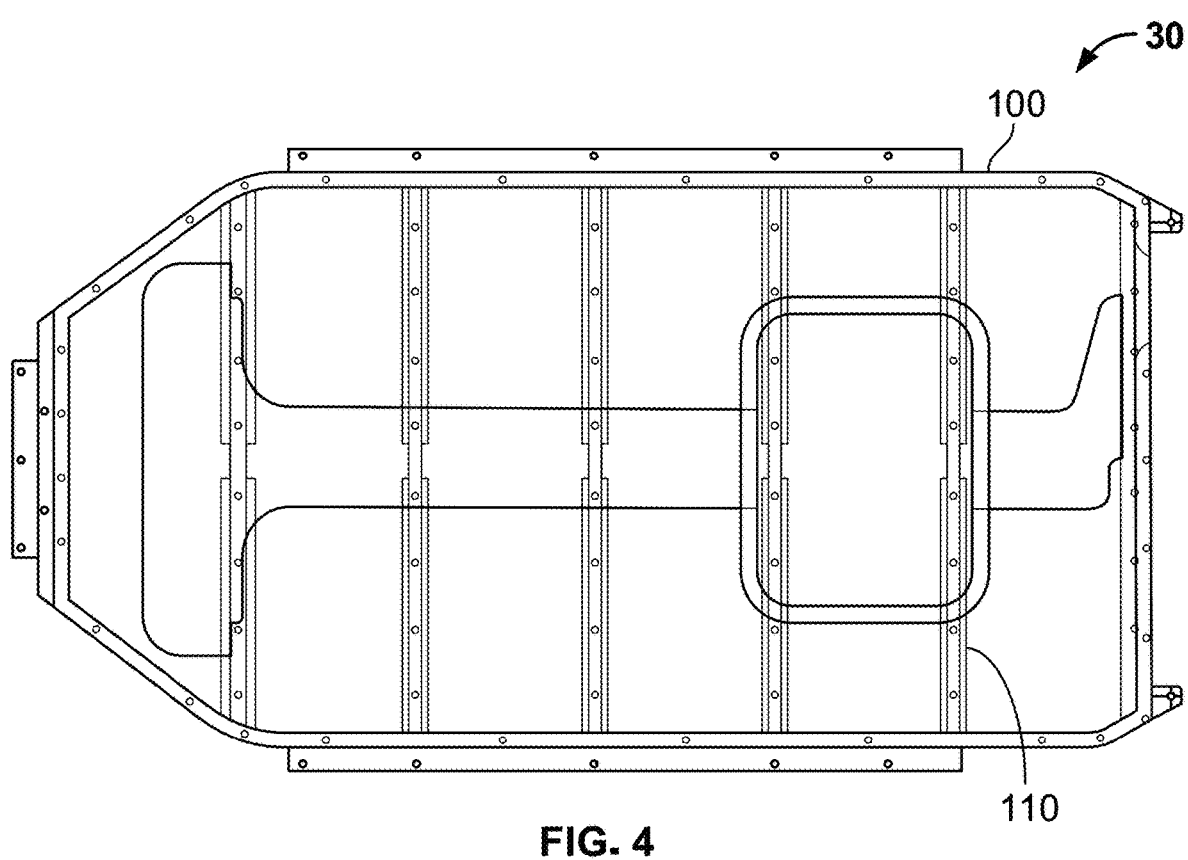
FIG. 4 is a top view of a larger sized electric vehicle battery pack frame constructed in accordance with embodiments of the disclosure.

As shown in FIG. 3 and FIG. 4, the side members 100 may be of various lengths, allowing the frames 30 to be of any size desired. In particular, two different size side members 100 may be used to construct frames 30 of two different sizes. A shorter frame 30, shown in FIG. 3, may be constructed from a pair of shorter side members 100, while a longer frame 30, shown in FIG. 4, may be constructed from two longer side members 100. The same cross members 110 are used for each frame 30 in FIG. 1 and FIG. 2. This allows the frames 30 to be made somewhat modular, with the same cross members 110 used and the size of the frame 30 determined by the length of the side member 100 used. In addition, as the side members 100 are extruded, forming different length members is relatively simple, as each member is simply extruded to its desired length, with no separate dies or tooling required for different length side members.

While not shown, it is also noted that the cross members 110 may also be made of different lengths, so that frames can be built to any desired width. The disclosure contemplates any length or number of lengths for the side members 100, so as to construct frames of any desired length. Similarly, the disclosure also contemplates any length or number of lengths for the cross members 110, so as to construct frames of any desired width.

The brackets 120 connect the cross members 110 to the inner surfaces of the side members 100, as shown in FIG. 2. The brackets 120 may be of any shape and configuration suitable for connecting cross members 110 to side members 100. The brackets 120 are attached to the side members 100 and cross members 110 with a high strength adhesive, flow drill screws, or a combination of the two.

The side members 100, cross members 110 and brackets 120 may be formed of any size and shape that is able to be extruded and that provides a battery pack 10 of sufficient strength to withstand vehicle impacts. Any suitable alloy of aluminum may be employed.

The side members 100 and/or cross members 110 may also be configured so that the lid 20 and/or bottom layer 40 may be affixed thereto in any manner. In some embodiments, the side members 100 and/or cross members 110 may be configured so that the lid 20 and/or bottom layer 40 are removably affixed to the frame 30. For example, any of the side members 100 and/or cross members 110 may have threaded bolt or screw holes 130 machined therein after they are extruded. The bolt or screw holes 130 may be machined in either one or both of the upper or lower surfaces of the side members 100 and/or cross members 110 (i.e., surfaces facing the lid 20 or bottom layer 40, respectively, in the view of FIG. 1), to allow the lid 20 and/or bottom layer 40 to be more easily and repeatably attached and removed. This provides both improved manufacturability and serviceability. Embodiments of the disclosure also contemplate other members besides bolts or screws for attachment of the lid 20 and/or bottom layer 40 to the side members 100 and/or cross members 110. Any type of member may be used, such as nails, clips, push pins, and the like.

The foregoing description, for purposes of explanation, used specific nomenclature to provide a thorough understanding of the disclosure. However, it will be apparent to one skilled in the art that the specific details are not required to practice the methods and systems of the disclosure. Thus, the foregoing descriptions of specific embodiments of the present disclosure are presented for purposes of illustration and description. They are not intended to be exhaustive or to limit the invention to the precise forms disclosed. Many modifications and variations are possible in view of the above teachings. For example, the structural members of the frame may be made of any type or alloy of extruded aluminum, and may be of any size, shape or configuration suitable for an electric vehicle battery pack frame. The embodiments were chosen and described in order to best explain the principles of the disclosure and its practical applications, to thereby enable others skilled in the art to best utilize the methods and systems of the disclosure and various embodiments with various modifications as are suited to the particular use contemplated. Additionally, different features of the various embodiments, disclosed or otherwise, can be mixed and matched or otherwise combined so as to create further embodiments contemplated by the disclosure.

What is claimed is:

1. An electric vehicle battery pack frame, the frame comprising:
   first and second side members oriented to define a space between inner surfaces thereof;
   a plurality of brackets, each comprising a surface affixed to the inner surface of one of the first and second side members; and
   a plurality of cross members each having opposite ends coupled to respective brackets of the plurality of brackets affixed to the inner surfaces of the first and second side members so as to extend through the space;
   wherein the first and second side members and the plurality of cross members are each formed of continuous extruded aluminum.

2. The electric vehicle battery pack frame of claim 1, wherein each bracket comprises extruded aluminum.

3. The electric vehicle battery pack frame of claim 1, wherein the surface of each bracket is adhesively affixed to the inner surface of its respective side member.

4. The electric vehicle battery pack frame of claim 1, wherein the surface of each bracket is affixed to the inner surface of its respective side member by one or more flow drill screws.

5. The electric vehicle battery pack frame of claim 1, wherein each bracket is adhesively affixed to the end of its respective cross member.

6. The electric vehicle battery pack frame of claim 1, wherein each bracket is affixed to its respective cross member by one or more flow drill screws.

7. The electric vehicle battery pack frame of claim 1, wherein one or more of the cross members, the first side members, or the second side members includes one or more fastener holes formed on an upper surface or an opposing lower surface thereof.

8. The electric vehicle battery pack frame of claim 1, wherein the cross members have a generally rectangular cross-sectional shape.

9. The electric vehicle battery pack frame of claim 1, wherein at least two of the cross members have differing lengths.

10. A set of electric vehicle battery pack frame members, the set comprising:
- first side members having a first length;
- second side members having a second length different from the first length;
- a plurality of modular brackets, each comprising a surface configured to be affixed to an inner surface of one of the first and second side members; and
- modular cross members each having substantially the same length;
- wherein two first side members and a plurality of the modular cross members are interconnected with the modular cross members oriented parallel to each other and the two first side members affixed to opposite ends of the modular cross members via respective modular brackets of the plurality of modular brackets so as to form a first battery pack frame having a first size;
- wherein two second side members and a plurality of the modular cross members are interconnected with the modular cross members oriented parallel to each other and the two second side members affixed to opposite ends of the modular cross members via respective modular brackets of the plurality of modular brackets so as to form a first battery pack frame having a second size different from the first size; and
- wherein the first and second side members and each modular cross member are each formed of continuous extruded aluminum.

11. The set of claim 10, wherein each modular bracket comprises extruded aluminum.

12. The set of claim 10, wherein the surface of each modular bracket is adhesively affixed to the inner surface of its respective side member.

13. The set of claim 10, wherein the surface of each modular bracket is affixed to the inner surface of its respective side member by one or more flow drill screws.

14. The set of claim 10, wherein each modular bracket is adhesively affixed to the end of its respective modular cross member.

15. The set of claim 10, wherein each modular bracket is affixed to its respective modular cross member by one or more flow drill screws.

16. The set of claim 10, wherein the first side members and second side members are extruded from a single die and are cut to different lengths.

17. The set of claim 10, wherein one or more of the cross members, the first side members, or the second side members includes one or more fastener holes formed on an upper surface or an opposing lower surface thereof.

18. The set of claim 10, wherein the cross members have a generally rectangular cross-sectional shape.

19. The electric vehicle battery pack frame of claim 1, wherein each bracket comprises a pair of flanges that forms an opening configured to receive a respective end of one of the plurality of crossmembers.

20. The electric vehicle battery pack frame of claim 19, wherein each bracket further comprises a tab configured to interface with a bottom surface of a respective end of one of the plurality of crossmembers.

* * * * *